(12) United States Patent
Groll

(10) Patent No.: US 6,427,904 B1
(45) Date of Patent: Aug. 6, 2002

(54) BONDING OF DISSIMILAR METALS

(75) Inventor: William A. Groll, McMurray, PA (US)

(73) Assignee: Clad Metals LLC, Canonsburg, PA (US)

( * ) Notice: Subject to any disclaimer, the term of this patent is extended or adjusted under 35 U.S.C. 154(b) by 0 days.

(21) Appl. No.: 09/331,114

(22) PCT Filed: Jan. 29, 1999

(86) PCT No.: PCT/US99/01974

§ 371 (c)(1),
(2), (4) Date: Jun. 17, 1999

(51) Int. Cl.⁷ .......................... B23K 31/02; B23K 20/00
(52) U.S. Cl. ..................... 228/265; 228/194; 228/235.2; 228/208
(58) Field of Search ................. 228/265, 194, 228/235.2, 208, 190

(56) References Cited

U.S. PATENT DOCUMENTS

| | | | |
|---|---|---|---|
| 2,484,118 A | | 10/1949 | Reynolds ..................... 29/189 |
| 2,707,323 A | | 5/1955 | Watson ...................... 29/470.9 |
| 3,078,563 A | | 2/1963 | Gould et al. .................. 29/494 |
| 3,173,202 A | * | 3/1965 | Farber ........................ 29/487 |
| 3,287,540 A | * | 11/1966 | Connelly .................... 219/118 |
| 3,295,197 A | | 1/1967 | Bunn et al. ................ 29/497.5 |
| 3,352,005 A | * | 11/1967 | Avellone .................... 29/484 |
| 3,400,450 A | | 9/1968 | Nock, Jr. et al. .......... 29/497.5 |
| 3,639,974 A | * | 2/1972 | Finnegan ..................... 29/493 |
| 3,833,983 A | * | 9/1974 | Baker et al. ............ 29/149.5 S |
| 3,921,885 A | * | 11/1975 | Knox .......................... 228/116 |
| 3,937,387 A | | 2/1976 | Fletcher et al. ............. 228/193 |
| 3,952,938 A | * | 4/1976 | Ulam .......................... 228/190 |
| 4,046,304 A | | 9/1977 | Tabata et al. ................ 228/187 |
| 4,122,992 A | * | 10/1978 | Duvall et al. ................ 228/176 |
| 4,141,482 A | * | 2/1979 | Reynolds .................... 228/158 |
| 4,188,438 A | * | 2/1980 | Burns ......................... 428/209 |
| 4,247,036 A | * | 1/1981 | Salesse et al. .............. 228/194 |
| 4,407,441 A | | 10/1983 | Aarts ......................... 228/176 |
| 4,774,149 A | * | 9/1988 | Fishman ..................... 428/680 |
| 4,838,474 A | | 6/1989 | Ohashi ....................... 228/121 |
| 4,854,495 A | * | 8/1989 | Yamamoto et al. .......... 228/124 |
| 5,083,697 A | * | 1/1992 | Difrancesco ................ 228/116 |
| 5,330,097 A | | 7/1994 | Inoue .......................... 228/194 |
| 5,439,165 A | * | 8/1995 | Cartossi ...................... 228/265 |
| 5,485,950 A | * | 1/1996 | Shibata et al. .............. 228/194 |
| 5,516,383 A | * | 5/1996 | Jha et al. .................... 148/531 |
| 5,709,957 A | * | 1/1998 | Chiang et al. .............. 428/615 |
| 5,779,871 A | * | 7/1998 | Gillich ........................ 205/116 |
| 6,071,556 A | * | 6/2000 | Beele ....................... 427/126.3 |
| 6,080,665 A | * | 6/2000 | Chen et al. ................. 438/653 |

FOREIGN PATENT DOCUMENTS

| | | |
|---|---|---|
| JP | 54-43152 | 4/1979 |
| JP | 63-194880 | 8/1988 |
| JP | 64-40187 | 2/1989 |
| JP | 64-40188 | 2/1989 |
| JP | 64-87086 | 3/1989 |

* cited by examiner

*Primary Examiner*—Tom Dunn
*Assistant Examiner*—L. E. Edmondson
(74) *Attorney, Agent, or Firm*—Webb Ziesenheim Logsdon Orkin & Hanson, P.C.

(57) ABSTRACT

A method of joining dissimilar metals includes the steps of applying a thin layer of pure aluminum to a surface of at least one of the dissimilar metals to be joined. The pure aluminum is applied by electroplating or by a PVD technique to prevent formation of oxides or intermetallic aluminum compounds in the pure aluminum layer. A barrier layer of chromium may also be applied between the substrate metal and the pure aluminum layer in high temperature applications such as where subsequent welding is anticipated to prevent the formation of harmful intermetallic compounds which may otherwise occur between the substrate and the pure aluminum layer. The sheets or slabs of dissimilar metals are then roll bonded by hot rolling with the aluminum layer forming an excellent diffusion bond therebetween. Difficult to bond metals such as copper, brass, carbon steel, titanium, certain aluminum alloys and zinc may be roll or press bonded in this way. The resultant articles made by the method find particular utility in cookware products, such as pots, pans, griddles, grills and bakeware and also as electrical contacts for bus bars, to mention a few.

13 Claims, No Drawings

BONDING OF DISSIMILAR METALS

BACKGROUND OF THE INVENTION

1. Field of the Invention

The present invention relates generally to bonding or cladding sheets of different metals or alloys to one another to form a multilayered composite for various end users such as cookware, electrical contacts and like articles.

2. Description of the Related Art

Heretofore, it has been common to form composites of dissimilar metals by roll bonding. This technique is successful with certain metals but not all. Problems develop in delamination, particularly when certain objectionable types of oxides are present on the bonding surface(s) of adjacent plates or sheets. The present invention is directed to overcoming this problem.

In order to achieve a proper bond between metals by conventional roll or pressure bonding, it is necessary to provide clean surface contact between the adjacent surfaces to permit interatomic sharing of electrons between the dissimilar metals to be joined. Certain metals, such as, for example, carbon steel, copper, brass, titanium, zinc and certain aluminum alloys (2000, 3000 and 6000 series) possess oxide surfaces when exposed to the atmosphere which are difficult to bond to, unless expensive measures are taken. The oxides formed on these above-mentioned metals are relatively ductile and, therefore, deform and stretch when roll bonding is attempted. Due to their ductile nature, these oxide layers do not permit the bonding metal to contact the underlying bare substrate metal in order to form the desired interatomic bond alluded to above.

Heretofore, in order to join one of the above-mentioned metals to a dissimilar metal, it is conventional practice to first clean the surface of the metal and then place the metal in a furnace having a reducing atmosphere of, for example, cracked ammonia or carbon monoxide, or the like. Exposure to this furnace atmosphere for a given time will cause the removal of surface oxides. The metal plate or sheet is then quickly moved to a rolling mill and the material is roll bonded to a dissimilar metal. This conventional technique thus requires expensive special controlled atmospheric furnaces and the attendant safety and environmental problems associated with potentially hazardous gases. In addition, it is well-known that the unwanted oxide surfaces can re-form rapidly as the material is transferred from the furnace to the rolling mill. This reoxidation occurs especially as the composite plate enters the roll bite area of the rolling mill. In this roll bite area, the metal in the entry portion of the roll bite is caused to extrude rearwardly, which causes the adjacent plates to continuously separate so as to allow atmospheric oxygen to rapidly gush into the thusly formed gap, causing reoxidation of the clean metal surface. When the oxide forms to an appreciable extent, the roll bond is weakened and delamination can occur. The prior art has recognized this problem and has proposed a solution which involves welding the perimeter of the plates prior to rolling, which prevents the influx of atmospheric oxygen into the gap formed upstream of the roll bite area. This welding operation, however, represents yet another added expense in capital equipment and labor cost to the finished product.

SUMMARY OF THE INVENTION

The present invention provides a superior bonded article and a method of bonding a wide variety of metals and metal alloys by applying to at least one or both mating interfaces a thin layer of pure aluminum, then applying heat and pressure to achieve a bond. The thin aluminum layer is preferably applied by an electrolytic plating process or by a physical vapor deposition ("PVD") technique.

The bonding of dissimilar metals has traditionally been achieved by either applying gross reduction at room temperature, lighter reduction in conjunction with heat or explosive bonding. In all of these cases, preparation of the surfaces is critical. As discussed above, surfaces must be clean and, in the case of many prior art metal combinations, free of oxides. The present invention employs the use of heat and pressure for bonding but differs from existing techniques in that the interface of metals to be bonded has at least one mating surface plated with pure aluminum to act as a bonding agent. Bonding by rolling, for example, is done without the need for special atmosphere controlled furnaces.

There is no need to provide a reducing or otherwise protective atmosphere, as required in the prior art, because the pure aluminum coating covers the objectionable ductile oxide coating on the first metal sheet or plate and strongly adheres thereto. The pure aluminum coating layer also naturally forms an oxide skin on its exposed surface, but aluminum oxide is a relatively brittle, non-ductile oxide. When the aluminum oxide skin is forced into facing contact with the second metal sheet or plate during roll bonding, the aluminum oxide skin readily fractures and exposes the underlying pure aluminum surface to permit the desired bare metal contact and the interatomic sharing of electrons between the adjacent metals to occur.

Thus, pure aluminum is a beneficial bonding agent for bonding dissimilar metals wherein one or both of the metal sheets or plates to be joined contain a ductile oxide surface. Certain metals, such as, for example, stainless steel and pure or EC (electrical grade) aluminum contain brittle oxide surfaces and do not require an aluminum coating layer to be applied prior to pressure bonding.

DETAILED DESCRIPTION OF THE INVENTION

An aluminum electroplating technology, known as the Segal process, was developed by Siemens A. G. of Germany. This technique is well-known in the art and the aluminum plating service is commercially available.

In certain circumstances, the pure aluminum (bonding agent) layer may also be applied to the metal plate or sheet by a physical vapor deposition (PVD) technique. The PVD technique is, likewise, well-known in the art. This is applicable in cases where the composite article being made will be subject to very high temperatures, particularly experienced during subsequent welding operations. In such instances, the high temperatures caused by welding oftentimes will produce a harmful intermetallic aluminum compound at the interface between the applied pure aluminum bonding agent layer and the substrate metal. Formation of the intermetallic aluminum compound may cause delamination to occur in the finished clad product due to the brittle nature of such intermetallic compounds. In order to prevent this occurrence, it is preferable to first apply a diffusion barrier layer of a metal, preferably chromium, to the substrate metal. The chromium is applied by a wet plating process. The pure aluminum bonding agent layer is then applied to the chromium barrier layer by the PVD technique because it is difficult to electroplate aluminum onto chromium. Hence, with this embodiment, harmful aluminum intermetallic compounds are not formed during subsequent welding operations because the pure aluminum layer is separated from the substrate metal by the chromium layer which provides a diffusion barrier between the pure aluminum layer and the substrate metal.

Aluminum electroplating and aluminum PVD coatings are different from known high temperature aluminum hot dipping or metal spraying in that there are no oxides or brittle intermetallics at the aluminum-to-substrate interface. Aluminum plating is a room temperature process which uses a non-aqueous electrolyte as a current carrier to deposit dissolved pure aluminum on the substrate surface. Typically, a current of 9 amp per square foot is applied to achieve a coating of 0.0005 inch per hour of plating time. The adhesion achieved by this process is extremely strong, cohesive and ductile, which is beneficial in subsequent roll bonding operations. Likewise, when the pure aluminum layer is applied by PVD, no harmful oxides or intermetallics are formed because the process takes place under vacuum conditions.

Pure aluminum is especially conducive to diffusion bonding to other aluminum alloys or other metals, particularly when heated to temperatures between 400° F. and 900° F. Plates or sheets of metal which have been prepared by the electroplating or PVD methods bond readily when heated and put under pressure with a hydraulic press or rolling mill. The pure aluminum layer serves as a protective coating to prevent oxidation of the substrate during heating as well as serving as a bonding agent. The aluminum plating process may be performed upon a wide variety of metals and metal alloys. Some of these include titanium, steel, copper, brass, aluminum alloys and zinc which are all characterized as having ductile oxide surfaces.

Examples of products utilizing the present invention include metal composites which combine high heat conductivity, corrosion resistance and strength, which are particularly suitable for cookware, for example. Such composites consisting of bonded layers of copper, titanium, aluminum, carbon steel and stainless steel in various combinations are suitable for cookware including pots, pans, bakeware and griddles. Composite metal articles utilizing the present invention also include metals which combine high electrical conductivity and light weight, such as, for example, a composite of copper and aluminum, which is particularly useful as electrical conductors or contacts.

By way of further example, a copper cored cooking griddle may be constructed by forming a composite plate comprising a thick (approximately ¼ inch) copper core with thin stainless steel layers roll bonded to the outer surfaces thereof. The copper core plate has the pure aluminum layer applied to both surfaces to permit the stainless steel sheets to be roll bonded thereto.

The aluminum layer, applied by electroplating to a substrate of copper, brass, titanium, zinc, carbon steel or the like, is preferably applied in a thickness of from about 0.0005 to 0.001 inch. In those cases where the aluminum layer is applied by the PVD technique, it is applied in a thickness of from about 0.0001 to 0.0003 inch. In those instances discussed above where subsequent welding is required, the chromium plated diffusion barrier layer is applied in a thickness of from about 0.0001 to 0.0008 inch. Actual illustrations of the present invention are presented in the following examples.

EXAMPLE I

A ¼ inch×12 inch×20 inch plate of C102 copper was plated on one side with a one to two mil (0.0001–0.0002 inch) thickness of pure aluminum using the Segal electroplating process. Before bonding, the plated aluminum surface was sanded with a dry aluminum oxide abrasive to promote roughness and ensure cleanliness. A ⅜ inch×12 inch×20 inch plate of 1145 grade aluminum was also sanded to achieve roughness and cleanliness and the copper plate was placed on top of the aluminum plate with the two sanded surfaces facing each other. The plates were heated to 600° F. in an oven without a protective atmosphere and promptly fed into the bite of a rolling mill. The mill took a 5% reduction in thickness. The force of reduction caused an aluminum-to-aluminum bond to form. The bond was further strengthened after two additional rolling passes for a total reduction of 10% of thickness. The composite was then heated to 550° F. to further sinter and strengthen the bond. The resulting copper-aluminum cladded material was tested by the conventional "twist" method, by the "180° bond" method and by the "chisel" method. All tests indicated that an excellent bond had been achieved.

EXAMPLE II

This example involves the manufacture of a composite article suitable for use as an electrical contact which must undergo a high temperature welding operation at the final installation. As mentioned above, high temperatures experienced during welding can create harmful internetallic aluminum compounds at the interface between aluminum and a substrate metal, which usually causes serious delamination problems. A plate of C102 copper measuring 6 inches wide×18 inches long×¼ inch thick was electroplated on one side with chromium in a wet plating bath. Plating thickness was between 0.0004–0.0008 inch. The chromium plated copper plate was then placed in a vacuum chamber of a conventional physical vapor deposition (PVD) apparatus and pure aluminum was applied to the chromium layer to a thickness of about 0.0003 inch. Prior to applying the aluminum layer, the chromium oxide naturally present on the chromium layer was displaced in the vacuum chamber by use of a reversed biased current. The thus-obtained plate of copper with the applied layers of chromium and pure aluminum layer thereon was placed in facing contact with a ½ inch thick plate of 1100 series aluminum (EC grade) measuring 6 inches wide by 16 inches long. The aluminum plate faced the pure aluminum layer of the copper plate. The stacked plates of copper and aluminum were then heated to about 800° F. in a regular atmosphere (containing oxygen) furnace. The heated, stacked plates were then transferred to a rolling mill and hot rolled in one pass with a reduction of 30%, to achieve roll bonding and a final thickness of about ½ inch in the copper-aluminum composite plate. The roll bonded composite plate was then heated in an oven at about 550° F. to further strengthen the roll bond. The copperaluminum composite plate was then sawed into 3 inch squares to form the electrical contacts. Samples were subjected to the standard chisel test and 180° bend test. All of the tests were satisfactory. Subsequent welding of the 1100 series aluminum plate side of the composite to an aluminum electrical bus bar was also successful. The chromium barrier layer separating the pure aluminum layer from the copper substrate was effective in preventing a diffusion between the copper and pure aluminum layers. Thus, no harmful aluminum intermetallic compounds were formed.

It is well-known in the art of metalworking as to what further steps may be required to produce a multilayered composite article such as a cooking utensil after the bonded clad sheet or plate is made. The bonded, clad sheet or plate may be further rolled to a desired thinner gauge and then cut into blanks for drawing into a desired product shape. In this manner, pots, pans, griddles or other products of various configurations may be formed from the composite sheets or plates of the present invention.

What is claimed is:

1. A method of bonding at least two metal plates or sheets comprising the steps of:
   a) providing a first metal plate or sheet having a ductile oxide surface selected from the group consisting of copper, copper alloys, brass, aluminum alloys, carbon steel, titanium and zinc;
   b) applying a barrier layer of a metal to at least one surface of the first metal plate or sheet by electroplating or PVD technique in a thickness of 0.0001 to 0.0008 inch;
   c) applying a layer of pure aluminum to the barrier layer by electroplating or PVD technique in a thickness of 0.0001 to 0.001 inch;
   d) providing at least one second metal plate or sheet, selected from the group consisting of stainless steel and EC grade aluminum;
   e) heating said plates or sheets to a hot working temperature;
   f) rolling said heated plates or sheets to effect a bond between the applied aluminum surface of the first plate or sheet to the second metal plate or sheet; and
   g) heating the bonded plates or sheets to strengthen the bond.

2. The method of claim 1 wherein the heating and rolling steps e) and f), respectively, are carried out at a temperature of between about 400° F. to about 900° F. in a non-protective atmosphere.

3. The method of claim 1 wherein the rolling step f) comprises a first rolling pass at a 5% reduction in thickness and an additional two passes, making a total reduction in thickness of 10%.

4. The method of claim 1 wherein the heating of the bonded plates or sheets of step g) is conducted at about 550° F. to effect diffusion and further strengthening of the bond.

5. The method of claim 1 wherein the pure aluminum layer is applied by electroplating to a thickness of between about 0.0005 to 0.001 inch.

6. The method of claim 1 wherein the pure aluminum layer is applied by a PVD technique to a thickness of between about 0.0001 to 0.0003 inch.

7. The method of claim 1 wherein the barrier layer of metal is chromium.

8. The method of claim 1 wherein the barrier layer metal and the pure aluminum layer are applied by a PVD technique.

9. A method of bonding at least two metal plates or sheets consisting of copper and stainless steel comprising the steps of:
   a) providing a plate or sheet of copper or copper alloy having a ductile oxide surface;
   b) applying a barrier layer of a metal to at least one surface of the copper or copper alloy plate or sheet by electroplating or PVD technique in a thickness of 0.0001 to 0.0008 inch;
   c) applying a layer of pure aluminum to the barrier layer by electroplating or PVD technique in a thickness of 0.0001 to 0.001 inch;
   d) providing at least one plate or sheet of stainless steel;
   e) heating said plates or sheets to a hot working temperature;
   f) rolling said heated plates or sheets to effect a bond between the applied aluminum surface of the copper or copper alloy plate or sheet to the stainless steel plate or sheet; and
   g) heating the bonded plates or sheets to strengthen the bond.

10. The method of claim 9 wherein the heating and rolling steps e) and f), respectively, are carried out at a temperature of between about 400° F. to about 900° F. in a non-protective atmosphere.

11. A method of bonding at least two metal plates or sheets of copper and EC grade aluminum comprising the steps of:
   a) providing a metal plate or sheet of copper;
   b) applying a barrier layer of a metal to at least one surface of the copper plate or sheet by electroplating or PVD technique in a thickness of 0.0001 to 0.0008 inch;
   c) applying a layer of pure aluminum to the barrier layer by electroplating or PVD technique in a thickness of 0.0001 to 0.001 inch;
   d) providing at least one plate or sheet of EC grade aluminum;
   e) heating said plates or sheets to a hot working temperature;
   f) rolling said heated plates or sheets to effect a bond between the applied aluminum surface of the copper plate or sheet to the EC grade aluminum plate or sheet; and
   g) heating the bonded plates or sheets to strengthen the bond.

12. The method of claim 11 wherein the heating and rolling steps e) and f), respectively, are carried out at a temperature of between about 400° F. to about 900° F. in a non-protective atmosphere.

13. The method of claim 11 wherein the barrier layer of step b) is chromium applied by wet plating to a thickness of 0.0004 to 0.0008 inch.

* * * * *